US011051025B2

(12) United States Patent
Xu et al.

(10) Patent No.: US 11,051,025 B2
(45) Date of Patent: Jun. 29, 2021

(54) METHOD AND APPARATUS FOR VIDEO CODING

(71) Applicant: Tencent America LLC, Palo Alto, CA (US)

(72) Inventors: Xiaozhong Xu, State College, PA (US); Guichun Li, Milpitas, CA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/203,091

(22) Filed: Nov. 28, 2018

(65) Prior Publication Data
US 2020/0021814 A1 Jan. 16, 2020

Related U.S. Application Data

(60) Provisional application No. 62/698,009, filed on Jul. 13, 2018.

(51) Int. Cl.
*H04N 19/176* (2014.01)
*H04N 19/149* (2014.01)
(Continued)

(52) U.S. Cl.
CPC ......... *H04N 19/149* (2014.11); *H04N 19/139* (2014.11); *H04N 19/159* (2014.11);
(Continued)

(58) Field of Classification Search
CPC .... H04N 19/176; H04N 19/52; H04N 19/593; G06T 3/0006
(Continued)

(56) References Cited

U.S. PATENT DOCUMENTS 5,959,672 A * 9/1999 Sasaki .................. H04N 19/176
375/240.23
6,366,701 B1 * 4/2002 Chalom ............. G06K 9/00335
382/236

(Continued)

FOREIGN PATENT DOCUMENTS

WO WO-2017130696 A1 * 8/2017 ........... H04N 19/513

OTHER PUBLICATIONS

L. Li, H. Li, D. Liu, Z. Li, H. Yang, L. Sixin, H. Chen, F. Wu, "An efficient four-parameter affine motion model for video coding", IEEE Transactions on Circuits and Systems for Video Technology, vol. PP, No. 99, 2017. (Year: 2017).*

(Continued)

*Primary Examiner* — Daniel Chang
(74) *Attorney, Agent, or Firm* — Oblon, McClelland, Maier & Neustadt, L.L.P.

(57) ABSTRACT

A method and apparatus for video coding. In some examples, an apparatus includes receiving circuitry and processing circuitry. The processing circuitry decodes prediction information of a block in a current picture from a coded video bitstream. The prediction information includes an index for prediction offset associated with an affine model in an inter prediction mode. The affine model is used to transform between the block and a reference block in a reference picture that has been reconstructed. Further, the processing circuitry determines parameters of the affine model based on the index and a pre-defined mapping of indexes and offset values, and reconstructs at least a sample of the block according to the affine model.

20 Claims, 14 Drawing Sheets

(51) Int. Cl.
*H04N 19/139* (2014.01)
*H04N 19/513* (2014.01)
*H04N 19/30* (2014.01)
*H04N 19/44* (2014.01)
*H04N 19/159* (2014.01)

(52) U.S. Cl.
CPC ............ *H04N 19/176* (2014.11); *H04N 19/30* (2014.11); *H04N 19/44* (2014.11); *H04N 19/521* (2014.11)

(58) Field of Classification Search
USPC .................... 375/240.12, 240.13, 240.16
See application file for complete search history.

(56) References Cited

U.S. PATENT DOCUMENTS

| | | | |
|---|---|---|---|
| 8,526,495 | B2 | 9/2013 | Liu et al. |
| 8,768,101 | B1* | 7/2014 | Repperger ............ G06K 9/6289 382/296 |
| 9,049,452 | B2 | 6/2015 | Liu et al. |
| 9,510,012 | B2 | 11/2016 | Liu et al. |
| 9,769,472 | B2 | 9/2017 | Liu et al. |
| 9,813,726 | B2 | 11/2017 | Liu et al. |
| 2011/0080954 | A1* | 4/2011 | Bossen .................. H04N 19/52 375/240.16 |
| 2012/0128261 | A1* | 5/2012 | Lee ........................ H04N 19/57 382/236 |
| 2012/0230405 | A1* | 9/2012 | An ....................... H04N 19/105 375/240.13 |
| 2013/0003849 | A1* | 1/2013 | Chien .................... H04N 19/13 375/240.16 |
| 2013/0279577 | A1* | 10/2013 | Schwarz ............. H04N 19/176 375/240.12 |
| 2014/0126644 | A1* | 5/2014 | Strom ................... H04N 19/14 375/240.16 |
| 2014/0177707 | A1* | 6/2014 | George ................. H04N 19/61 375/240.03 |
| 2016/0134886 | A1* | 5/2016 | Chen .................... H04N 19/503 375/240.08 |
| 2016/0196653 | A1* | 7/2016 | Grant ................... H04N 5/2258 382/294 |
| 2017/0013279 | A1* | 1/2017 | Puri ..................... H04N 19/527 |
| 2018/0091816 | A1* | 3/2018 | Chien ................... H04N 19/70 |
| 2018/0098063 | A1* | 4/2018 | Chen ................... H04N 19/105 |
| 2018/0192047 | A1* | 7/2018 | Lv ....................... H04N 19/105 |
| 2018/0192069 | A1* | 7/2018 | Chen .................... H04N 19/52 |
| 2018/0220149 | A1* | 8/2018 | Son ..................... H04N 19/176 |
| 2018/0270500 | A1* | 9/2018 | Li ......................... H04N 19/54 |
| 2018/0278951 | A1* | 9/2018 | Seregin ................. H04N 19/44 |
| 2019/0028731 | A1* | 1/2019 | Chuang ............... H04N 19/105 |
| 2020/0021845 | A1* | 1/2020 | Lin ..................... H04N 19/176 |
| 2020/0107043 | A1* | 4/2020 | Hung .................. H04N 19/105 |

OTHER PUBLICATIONS

F. Zou, J. Chen, M. Karczewicz, X. Li, H.-C. Chuang, W.-J.Chien, "EE4: Improved affine motion prediction," Joint Video Exploration Team (JVET), 4th Meeting, JVET-D0121, Oct. 2016 (Year: 2016).*

A. Alshin et al., "Description of SDR, HDR and 360 video coding technology proposal by Samsung, Huawei, GoPro, and HiSilicon—mobile application scenario," Joint Video Exploration Team (JVET), 10th Meeting, JVET-J0024, Apr. 2018 (Year: 2018).*

High Efficiency Video Coding, Rec. ITU-T H.265 v4 Dec. 2016.

Li Li, Houdiang Li, Zhuoyi Lv, Haitao Yang, "An affine motion compensation framework for high efficiency video coding", 2015 IEEE International Symposium on Circuits and Systems (ISCAS), May 2015.

H. Huang, J. Woods, Y. Zhao and H. Bai, "Control-Point Representation and Differential Coding Affine-Motion Compensation", IEEE Transactions on Circuits and Systems for Video Technology, vol. 23, Issue: 10, pp. 1651-1660, Oct. 2013.

Shan Liu, JongWon Kim and C.-C. Jay Kuo, "Hybrid global/local motion compensated frame interpolation for low bit rate video coding," the Journal of Visual Communication and Image Representation, vol. 14, pp. 61-79, Jun. 2003.

X. Cao, et al, "AHG16: SDIP unified with NSQT", JCTVC-H0347, Joint Collaborative Team on Video Coding (JCTVC), of ITU-T SG 16 WP 3 and ISO/IEC JTC 1/SC 29/WG 11, San Jose, CA, Feb. 2012.

Lai, et al, "SCE3. 4 generalized combined prediction", ITU-T/ISO/IEC, JCTVC-M0221, 2013.

Lai, et al, "Non-SCE3.4: Simplified Generalized Combined Prediction", ITU-T/ISO/IEC, JCTVC-M0222, 2013.

Seregin, et al, "Uni-prediction for combined inter mode", ITU-T/ISO/IEC, JCTVC-M0445, 2013.

Xu, et al, "On unification of intra block copy and inter-picture motion compensation", ISO/IEC JTC1/SC29/WG11 JCTVC-Q0132, 2014.

Xu, et al, "Non-CE2: Intra BC merge mode with default candidates", ISO/IEC JTC1/SC29/WG11 JCTVC-S0123, 2014.

Xu, et al, "CE2: Test 3.2—Intra BC merge mode with default candidates", ISO/IEC JTC1/SC29/WG11 JCTVC-T0073, 2015.

H. Yang, et al, "Description of Core Experiment 4 (CE4): Inter prediction and motion vector coding", ISO/IEC JTC1/SC29/WG11 JVET-J1024, 2018.

S. Jeong, M. W. Park, C. Kim, "CE4 Ultimate motion vector expression in JVET-J0024 (Test 4.2.9)", JVET-K0115, Jul. 2018.

Y. Wang, et al, "CE4.2.12 Affine merge mode", JVET-K0355, 2018.

Shan Liu, JongWon Kim and C.-C. Jay Kuo, "Video Coding via Adaptive Selection of Generalized Motion Prediction Modes" in the Picture Coding Symposium 2001, Seoul, Korea, Apr. 25-27, 2001.

Shan Liu, JongWon Kim and C.-C. Jay Kuo, "MCI-embedded motion-compensated prediction for quality enhancement of frame interpolation" in Multimedia Systems and Applications III, vol. 4209, p. 251-262, Mar. 2001.

Shan Liu, JongWon Kim and C.-C. Jay Kuo, "Nonlinear motion-compensated interpolation for low-bit-rate video" in Applications of Digital Image Processing XXIII, vol. 4115, p. 203-214, 2000.

S. Lin, H. Chen, H. Zhang, S. Maxim, H. Yang, J. Zhou, "Affine transform prediction for next generation video coding", ITU-T SG16 Doc. COM16-C1016, Oct. 2015.

* cited by examiner

METHOD AND APPARATUS FOR VIDEO CODING

INCORPORATION BY REFERENCE

This present disclosure claims the benefit of priority to U.S. Provisional Application No. 62/698,009, "TECHNIQUES FOR SIMPLIFIED AFFINE MOTION COMPENSATION WITH PREDICTION OFFSETS" filed on Jul. 13, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide method and apparatus for video encoding/decoding. In some examples, an apparatus includes processing circuitry for video decoding. The processing circuitry decodes prediction information of a block in a current picture from a coded video bitstream. The prediction information includes an index for prediction offset associated with an affine model in an inter prediction mode. The affine model is used to transform between the block and a reference block in a reference picture that has been reconstructed. Further, the processing circuitry determines parameters of the affine model based on the index and a pre-defined mapping of indexes and offset values, and reconstructs at least a sample of the block according to the affine model.

In some embodiments, the processing circuitry determines values of translational parameters of the affine model according to a motion vector, and determines a non-translational parameter for the affine model according to the index and the pre-defined mapping. In an example, the processing circuitry decodes the index for a delta value to a default of a scaling factor in the affine model, and determines the delta value according to the index and the pre-defined mapping of indexes and delta values for the scaling factor. In another example, the processing circuitry decodes the index for a delta value to a default of a rotation angle in the affine model, and determines the delta value according to the index and the pre-defined mapping of indexes and delta values for the rotation angle.

In some embodiments, the processing circuitry decodes the index for a motion vector difference, and derives the affine model based on a predicted motion vector and the motion vector difference. In an example, the processing circuitry decodes a first index for a direction of the motion vector difference and a second index for a pixel distance of the motion vector difference. In another example, the processing circuitry decodes the index for both a direction and a pixel distance of the motion vector difference.

In another example, the processing circuitry decodes indexes for two motion vector differences respectively for two control points, and determines motion vectors respectively for the two control points based on the two motion vector differences. Then the processing circuitry derives a 4-parameter affine model based on the motion vectors of the two control points.

In another example, the processing circuitry decodes indexes for three motion vector differences respectively for three control points and determines motion vectors respectively for the three control points based on the three motion vector differences. Then, the processing circuitry derives a 6-parameter affine model based on the motion vectors of the three control points.

In an embodiment, the processing circuitry decodes a first index for a first motion vector difference for a first control point and predicts a second motion vector difference for a second control point based on the first motion vector difference. Then, the processing circuitry decodes a prediction error to correct the second motion vector difference from the coded video bitstream. Further, the processing circuitry determines a first motion vector for the first control point and a second motion vector for the second control point based on the first motion vector difference and the corrected second motion vector difference, and derives the affine model at least based on the first motion vector for the first control point and the second motion vector for the second control point.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
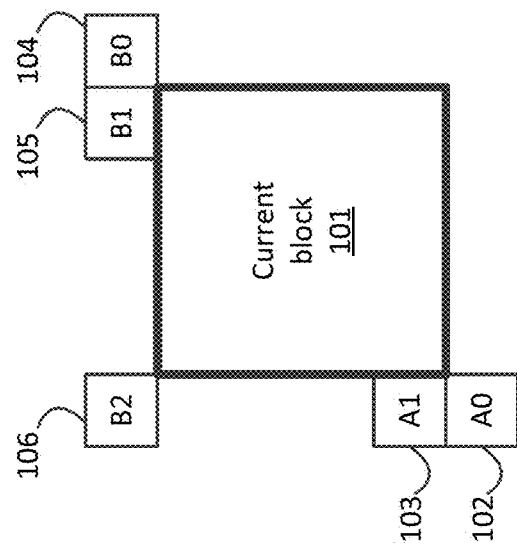
FIG. 1 is a schematic illustration of a current block and its surrounding spatial merge candidates in accordance with H.265.
Figure 2:
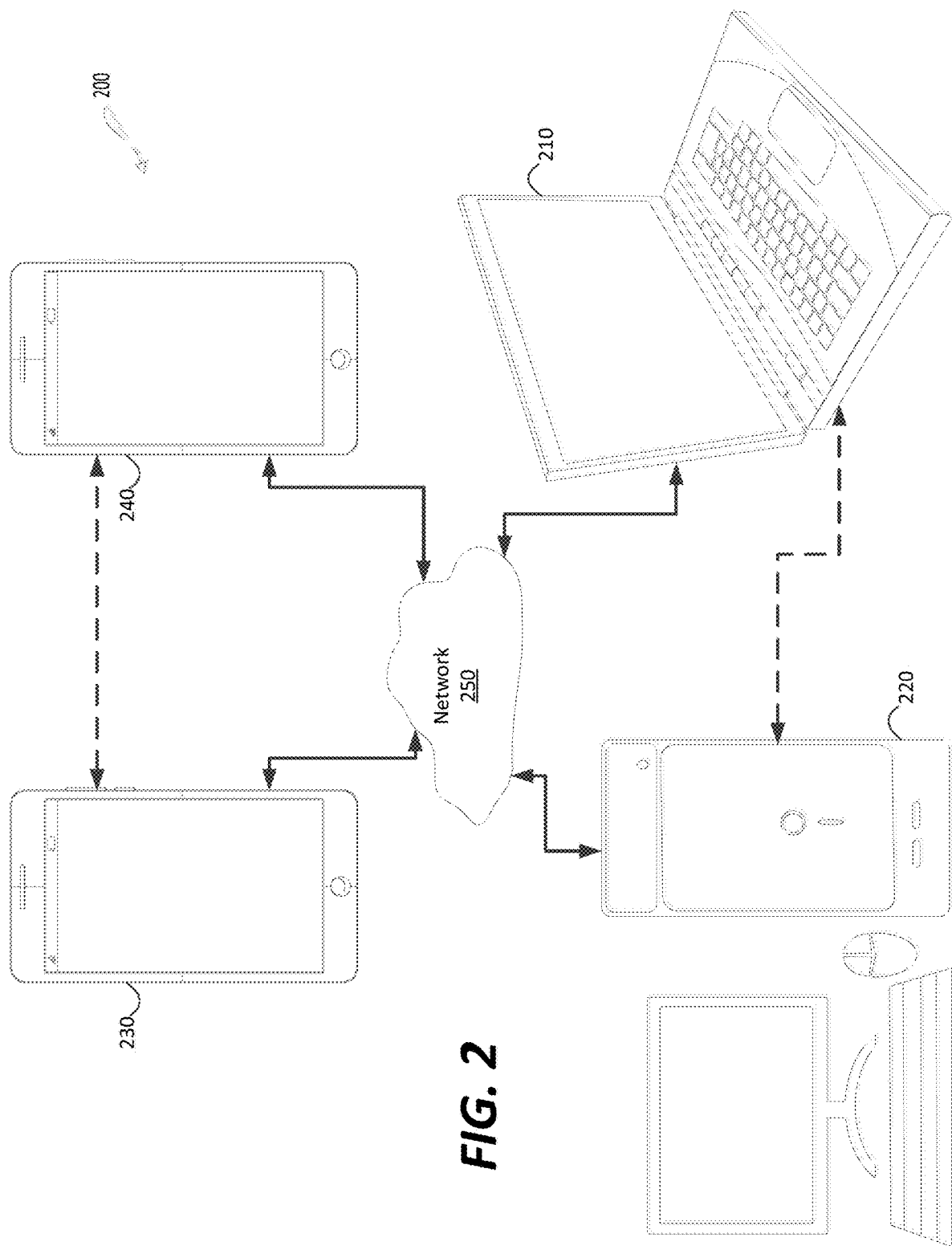
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
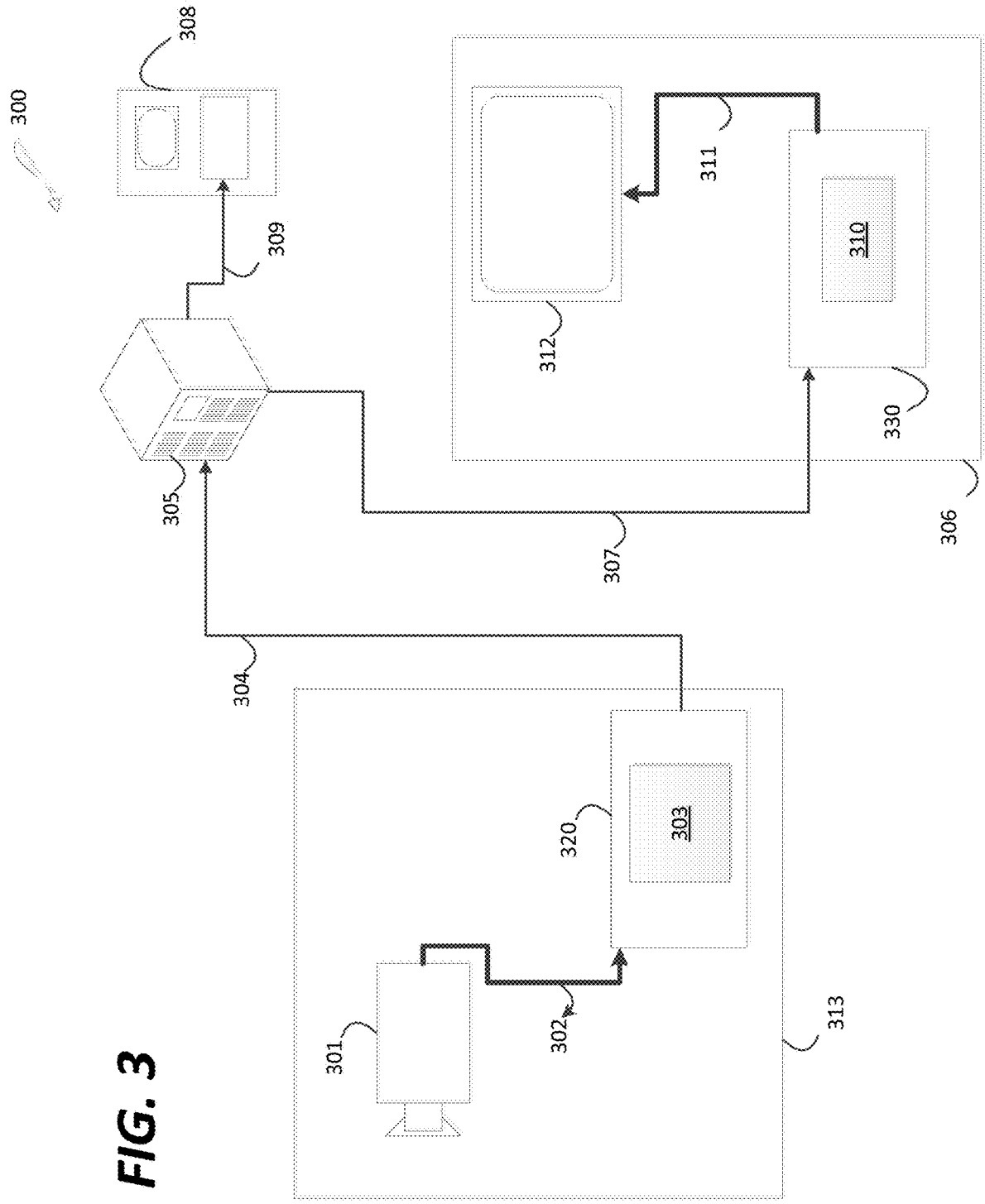
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
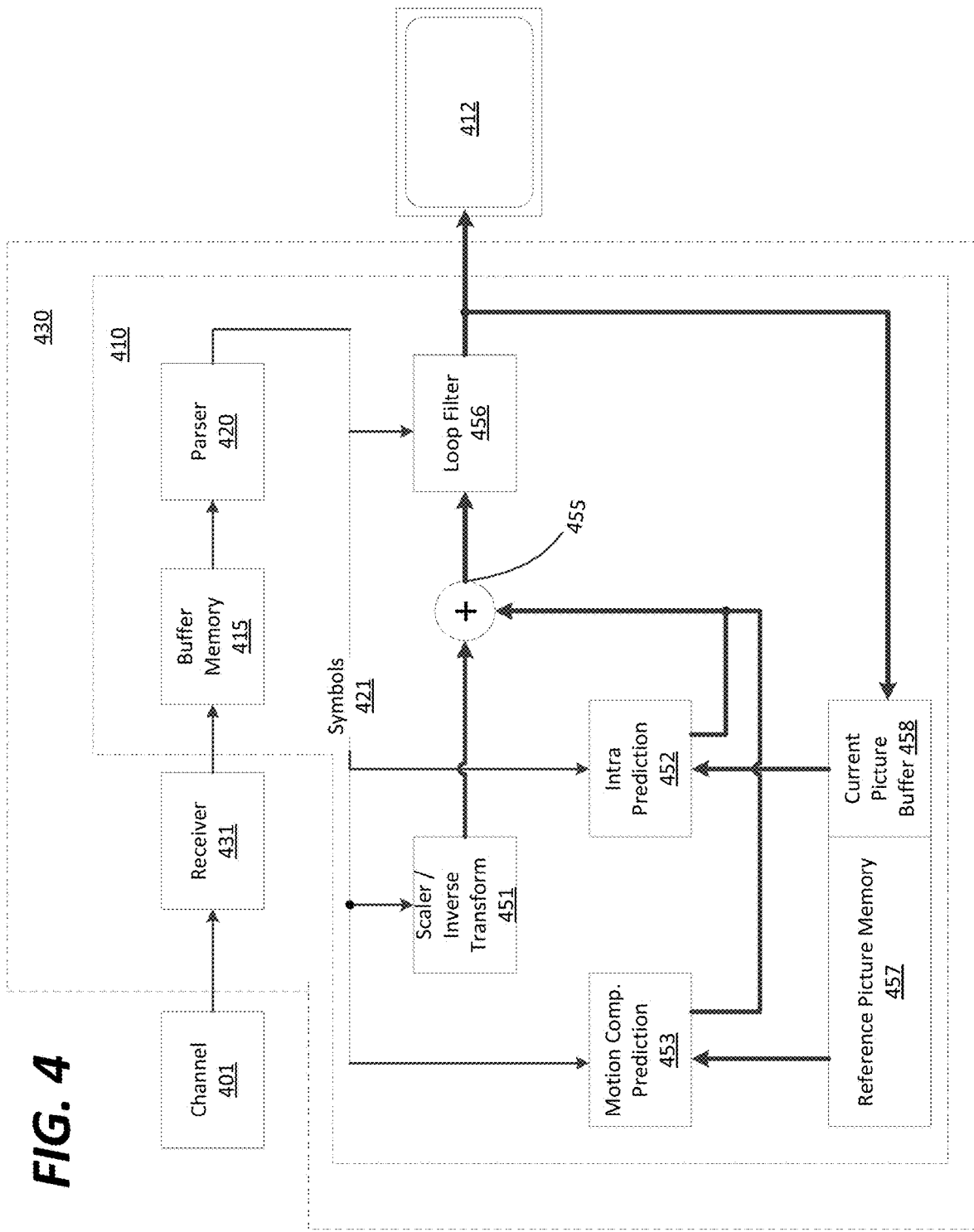
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
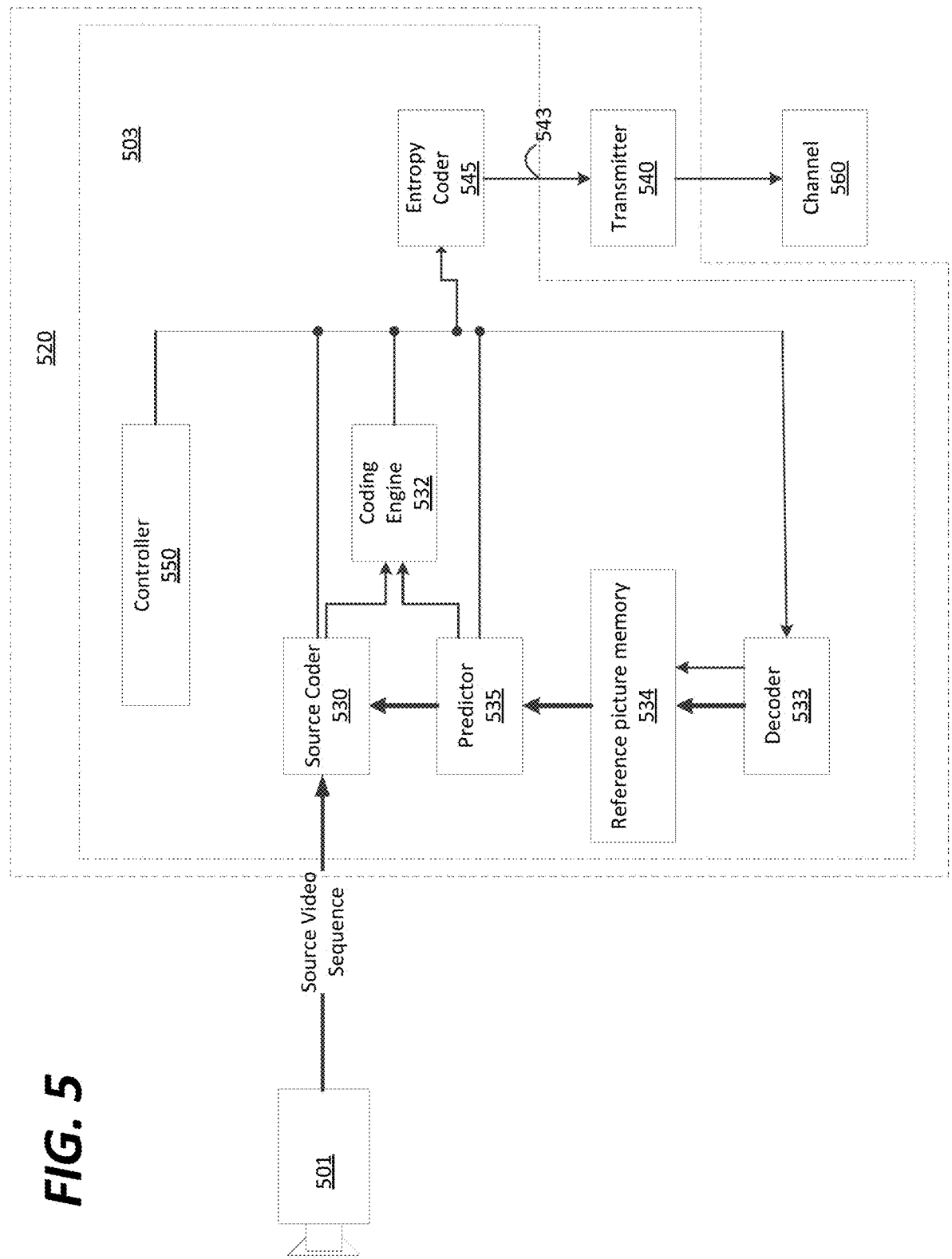
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
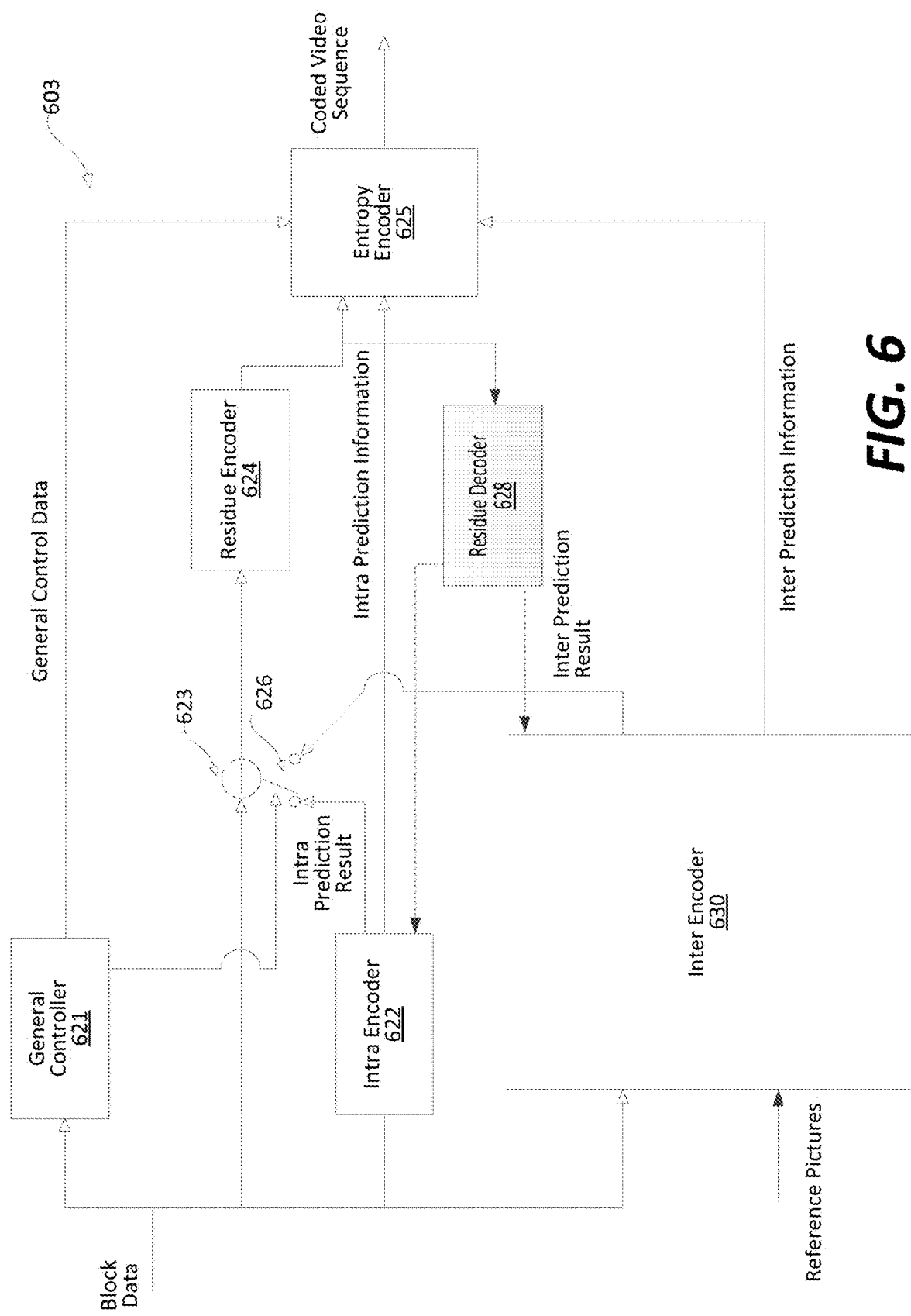
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603)

includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
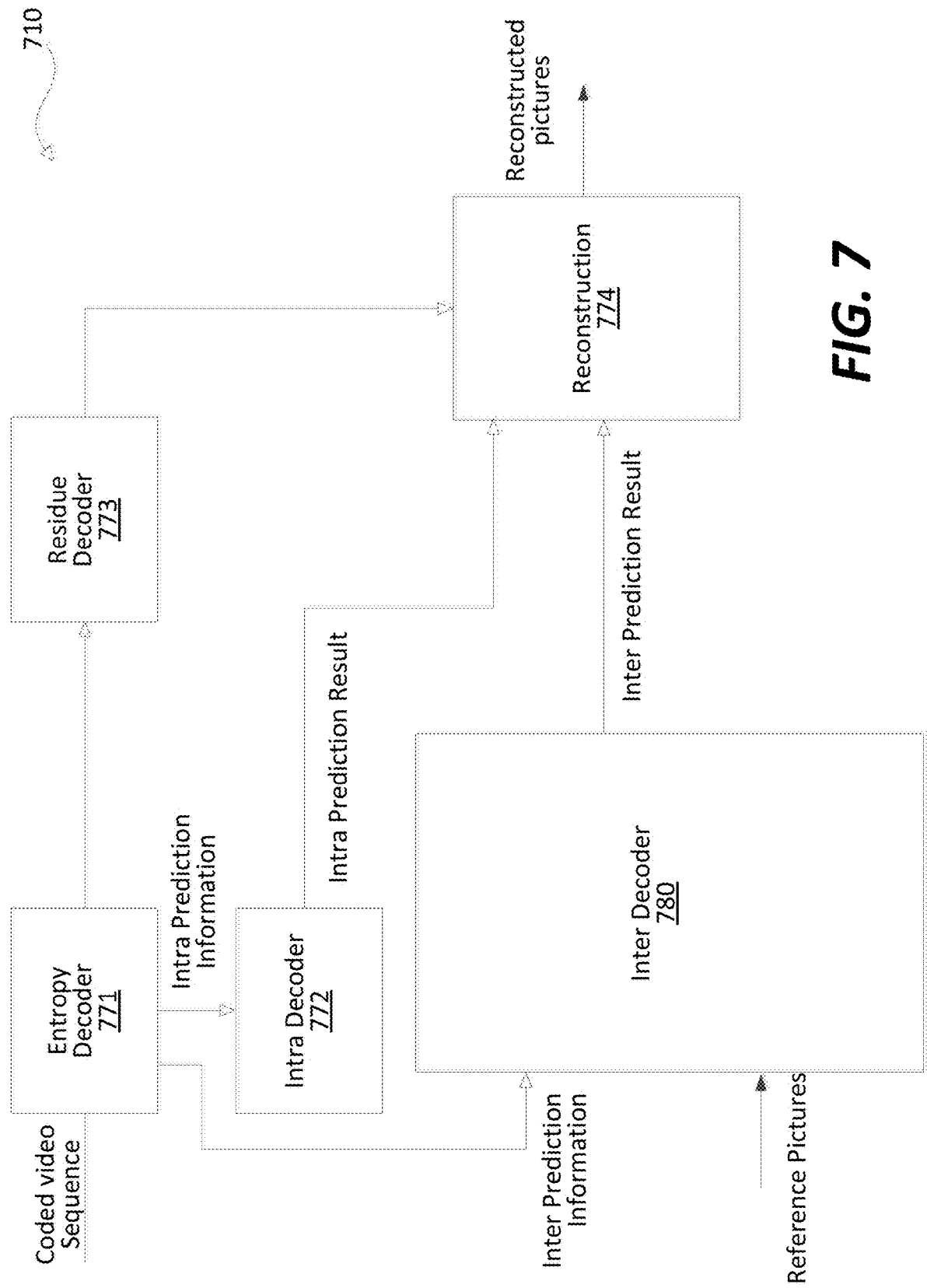
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques to simplify affine motion compensation with prediction offsets.

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both the AMVP mode and the merge mode construct candidate list during decoding.

Figure 8:
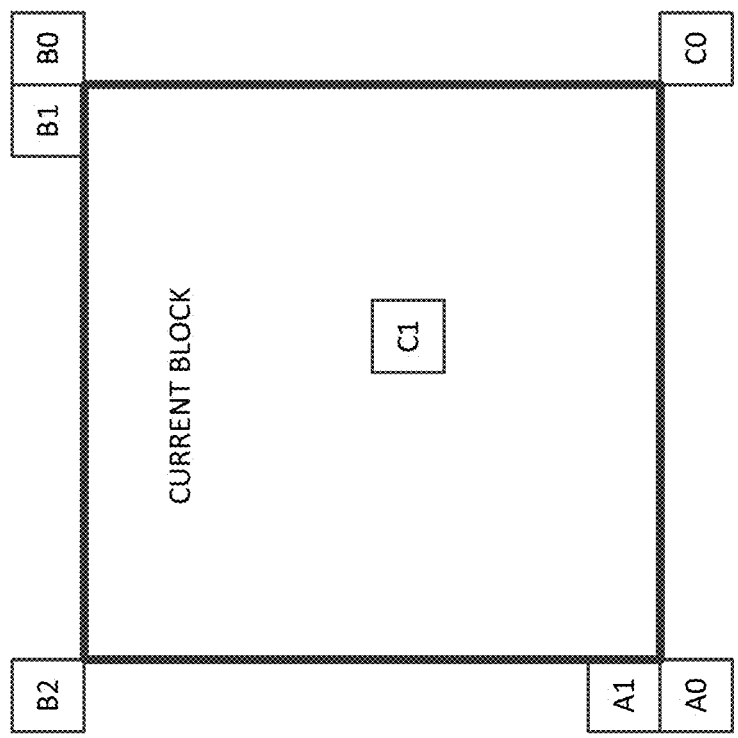
FIG. 8 shows an example of spatial and temporal candidates in some examples.

FIG. 8 shows an example of spatial and temporal candidates in some examples.

For the merge mode in the inter prediction, merge candidates in a candidate list are primarily formed by checking motion information from either spatial or temporal neighboring blocks of the current block. In the FIG. 8 example, candidate blocks A1, B1, B0, A0 and B2 are sequentially checked. When any of the candidate blocks are valid candidates, for example, are coded with motion vectors, then, the motion information of the valid candidate blocks can be added into the merge candidate list. Some pruning operation is performed to make sure duplicated candidates will not be put into the list again. The candidate blocks A1, B1, B0, A0 and B2 are adjacent to corners of the current block, and are referred to as corner candidates.

After spatial candidates, temporal candidates are also checked into the list. In some examples, the current block's co-located block in a specified reference picture is found. The motion information at C1 position (bottom right corner of the current block) of the co-located block will be used as temporal merge candidate. If the block at this position is not coded in inter mode or not available, C1 position (at the outer bottom right corner of the center of the co-located block) will be used instead. The present disclosure provide techniques to further improve merge mode.

The advanced motion vector prediction (AMVP) mode in HEVC refers to using spatial and temporal neighboring blocks' motion information to predict the motion information of the current block, while the prediction residue is further coded. Examples of spatial and temporal neighboring candidates are shown in FIG. 8 as well.

In some embodiments, in AMVP mode, a two-candidate motion vector predictor list is formed. For example, the list includes a first candidate predictor and a second candidate predictor. The first candidate predictor is from the first available motion vector from the left edge, in the order of spatial A0, A1 positions. The second candidate predictor is from the first available motion vector from the top edge, in the order of spatial B0, B1 and B2 positions. If no valid motion vector can be found from the checked locations for either the left edge or the top edge, no candidate will be filled in the list. If the two candidates available and are the same, only one will be kept in the list. If the list is not full (with two different candidates), the temporal co-located motion vector (after scaling) from C0 location will be used as another candidate. If motion information at C0 location is not available, location C1 will be used instead.

In some examples, if there are still no enough motion vector predictor candidates, zero motion vector will be used to fill up the list.

In some embodiments, prediction offsets can be signaled on top of existing merge candidates. For example, a technique that is referred to as ultimate motion vector expression (UMVE) uses a special merge mode in which an offset (both magnitude and direction) on top of the existing merge candidates is signaled. In this technique, a few syntax elements, such as a prediction direction IDX, a base candidate IDX, a distance IDX, a search direction IDX, and the like, are signaled to describe such an offset. For example, the prediction direction IDX is used to indicate which of the prediction directions (temporal prediction direction, e.g., L0 reference direction, L1 reference direction or L0 and L1 reference directions) is used for UMVE mode. The base candidate IDX is used to indicate which of the existing merge candidates is used as the start point (based candidate) to apply the offset. The distance IDX is used to indicate how large the offset is from the starting point (along x or y direction, but not both). The offset magnitude is chosen from a fix number of selections. The search direction IDX is used to indicate the direction (x or y, + or − direction) to apply the offset.

In an example, assuming the starting point MV is MV_S, the offset is MV_offset. Then the final MV predictor will be MV_final=M_S+MV_offset.

Figure 9:
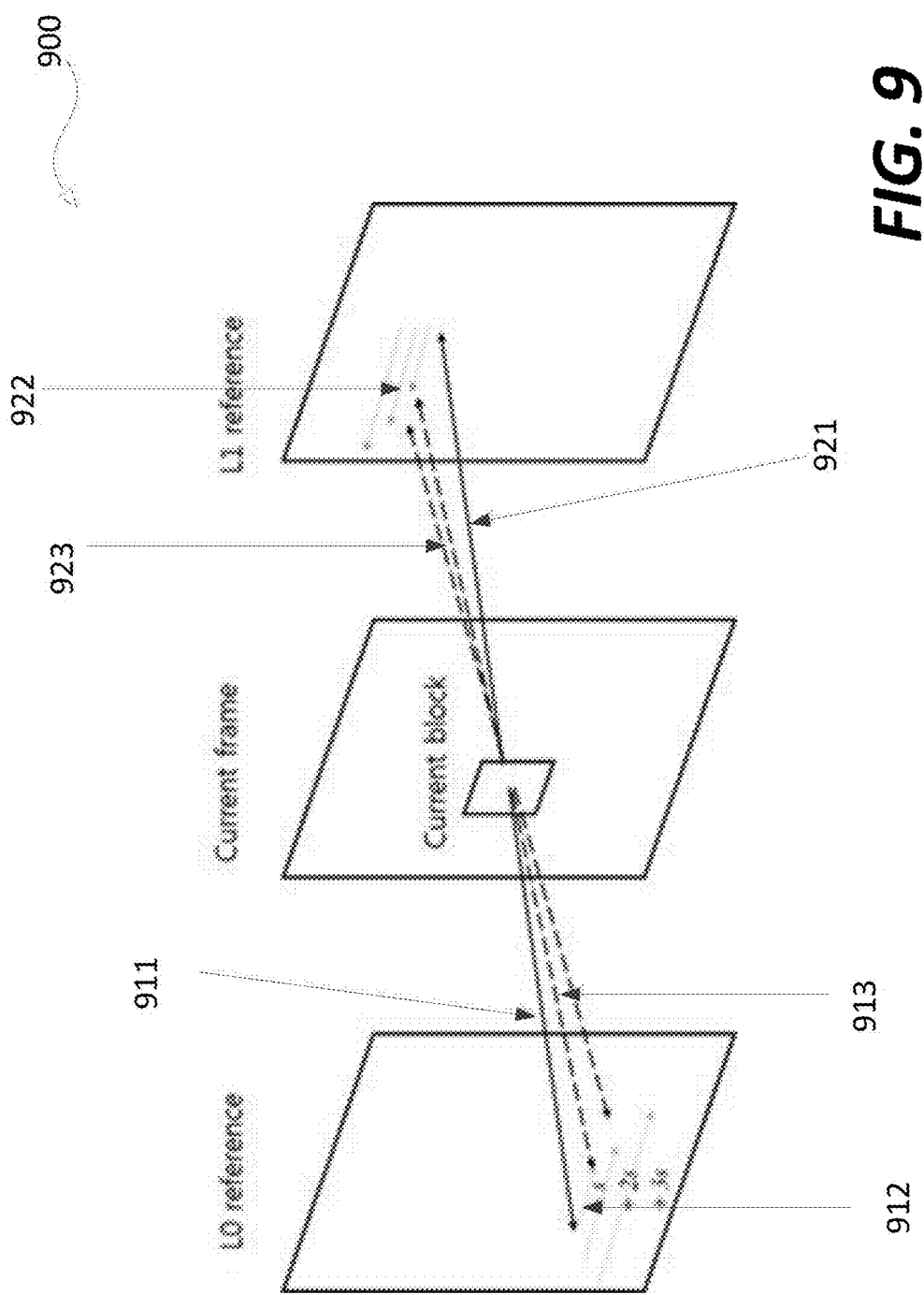
FIG. 9 shows examples for UMVE according to an embodiment of the disclosure.

FIG. 9 shows examples for UMVE according to an embodiment of the disclosure. In an example, the starting point MV is shown by (911) (for example according to the prediction direction IDX and base candidate IDX), the offset is shown by (912) (for example according to the distance IDX and the search direction IDX), and the final MV predictor is shown by (913) in FIG. 9. In another example, the starting point MV is shown by (921) (for example according to the prediction direction IDX and base candidate IDX), the offset is shown by (922) (for example according to the distance IDX and the search direction IDX), and the final MV predictor is shown by 923 in FIG. 9.

Figure 10:
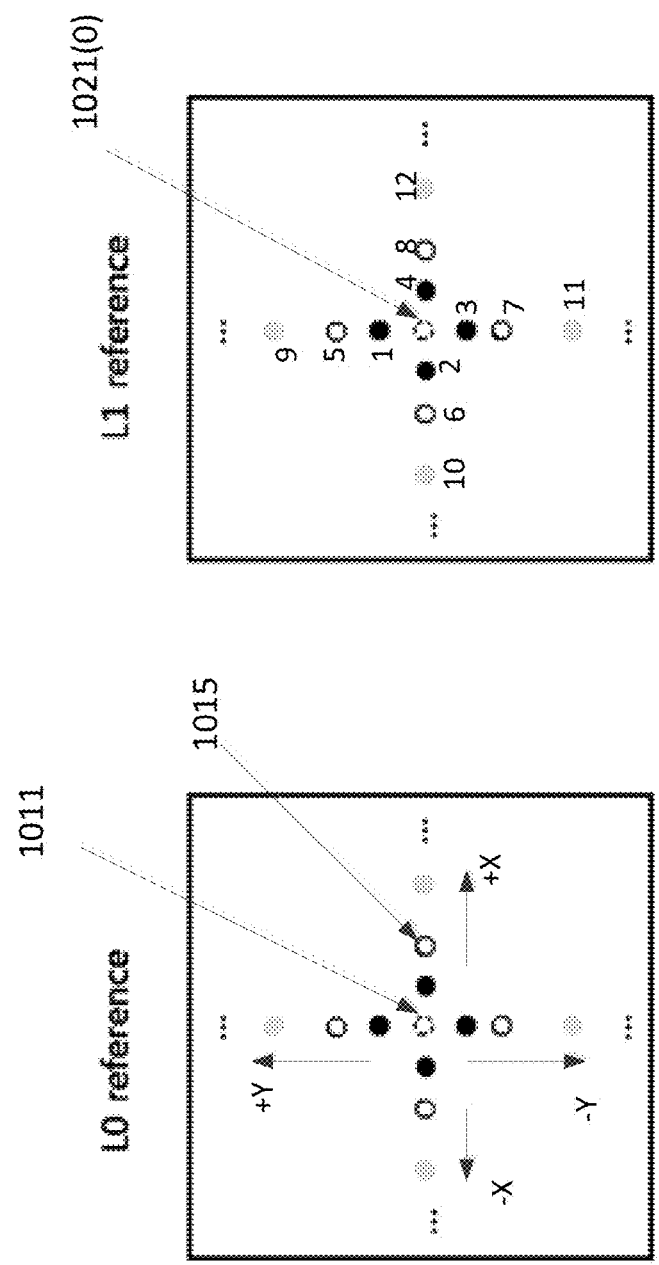
FIG. 10 shows examples for UMVE according to an embodiment of the disclosure.

FIG. 10 shows examples for UMVE according to an embodiment of the disclosure. For example, the starting point MV is shown by (1011) (for example according to the prediction direction IDX and base candidate IDX). In the FIG. 10 example, 4 search directions, such as +Y, −Y, +X and −X, are used, and the four search directions can be indexed by 0, 1, 2, 3. The distance can be indexed by 0 (0 distance to the starting point MV), 1 (1 s to the starting point MV), 2 (2 s to the starting point MV), 3 (3 s to the starting point), and the like. Thus, when the search direction IDX is 3, and the distance IDX is 2, the final MV predictor is shown as 1015.

In another example, the search direction and the distance can be combined for indexing. For example, the starting point MV is shown by (1021) (for example according to the prediction direction IDX and base candidate IDX). The search direction and the distance are combined to be indexed by 0-12 as shown in FIG. 10.

According to an aspect of the disclosure, affine motion compensation, by describing a 6-parameter (or a simplified 4-parameter) affine model for a coding block, can efficiently predict the motion information for samples within the current block. More specifically, in an affine coded or described coding block, different part of the samples can have different motion vectors. The basic unit to have a motion vector in an affine coded or described block is referred to as a sub-block. The size of a sub-block can be as small as 1 sample only; and can be as large as the size of current block.

When an affine mode is determined, for each sample in the current block, its motion vector (relative to the targeted reference picture) can be derived using such a model (e.g., 6 parameter affine motion model or 4 parameter affine motion model). In order to reduce implementation complexity, affine motion compensation is performed on a sub-block basis, instead of on a sample basis. That means, each sub-block will derive its motion vector and for samples in each sub-block, the motion vector is the same. A specific location of each sub-block is assumed, such as the top-left or the center point of the sub-block, to be the representative location. In one example, such a sub-block size contains 4×4 samples.

In general, an affine motion model has 6 parameters to describe the motion information of a block. After the affine transformation, a rectangular block will become a parallelogram. In an example, the 6 parameters of an affine coded block can be represented by 3 motion vectors at three different locations of the block.

Figure 11:
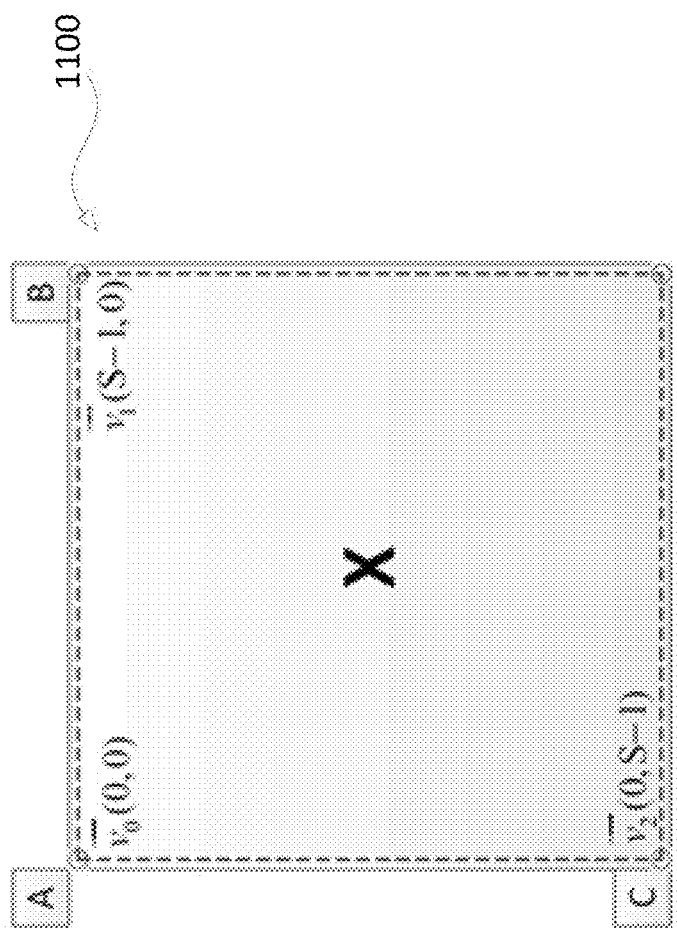
FIG. 11 shows an example of a block with an affine motion model.

FIG. 11 shows an example of a block (1100) with an affine motion model. The block (1100) uses motion vectors $\vec{v}_0$, $\vec{v}_1$, and $\vec{v}_2$ at three corner locations A, B and C to describe the motion information of the affine motion model used for the block (1100). These locations A, B and C are referred to as control points.

In simplified example, an affine motion model uses 4 parameters to describe the motion information of a block based on an assumption that after the affine transformation, the shape of the block does not change. Therefore, a rectangular block will remain a rectangular and same aspect ratio (e.g., height/width) after the transformation. The affine motion model of such a block can be represented by two motion vectors at two different locations, such as at corner locations A and B.

Figure 12:
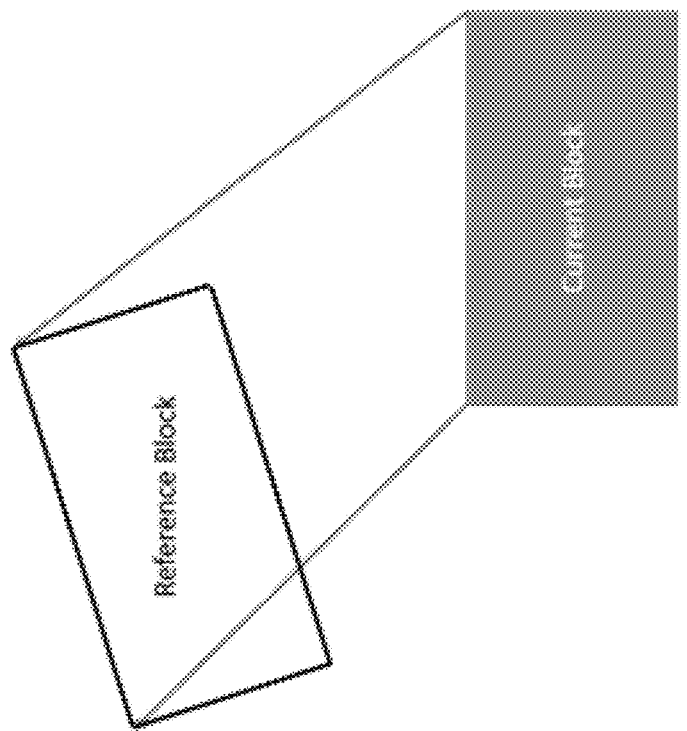
FIG. 12 shows examples of affine transformation according to some embodiments of the disclosure.
Figure 12:
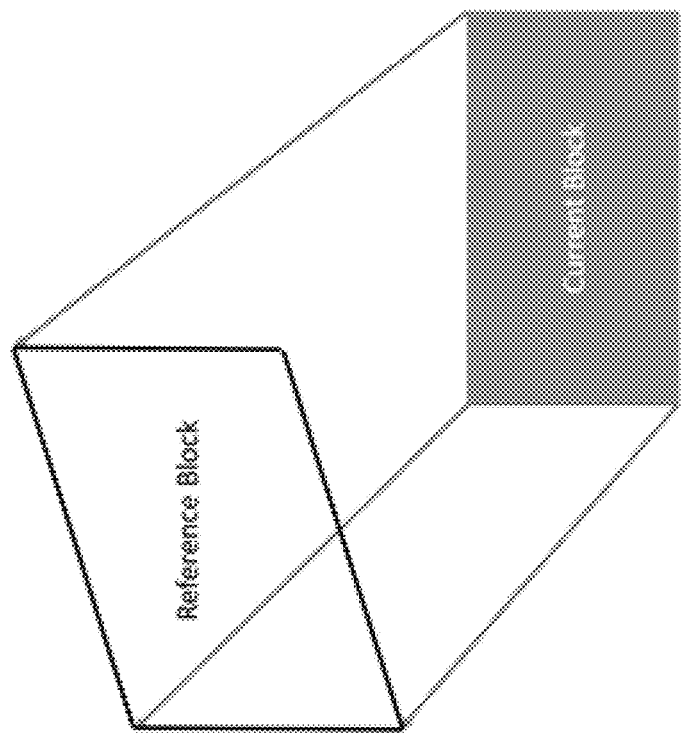

FIG. 12 shows examples of affine transformation for a 6-parameter affine mode (using 6-parameter affine model) and a 4-parameter affine mode (using 4-parameter affine model).

In an example, when assumptions are made such that the object only has zooming and translational motions, or the object only has rotation and translation models, then the affine motion model can be further simplified to a 3-parameter affine motion model with 2 parameters to indicate the translational part and 1 parameter to indicate either a scaling factor for zooming or an angular factor for rotation.

According to an aspect of the disclosure, when affine motion compensation is used, two signaling techniques can be used. The two signaling techniques are referred to as a merge mode based signaling technique and a residue (AMVP) mode based signaling technique.

For the merge mode based signaling technique, the affine information of the current block is predicted from previously affine coded blocks. In one method, the current block is assumed to be in the same affine object as the reference block, so that the MVs at the control points of the current block can be derived from the reference block's model. The MVs at the current block' other locations are just linearly modified in the same way as from one control point to another in the reference block. This method is referred to as model based affine prediction. In another method, neighboring blocks' motion vectors are used directly as the motion vectors at current block's control points. Then motion vectors at the rest of the block are generated using the information from the control points. This method is referred to as control point based affine prediction. In either method, no residue components of the MVs at current block are to be signaled. In other words, the residue components of the MVs are assumed to be zero.

For the residue (AMVP) mode based signaling technique, affine parameters, or the MVs at the control points of the current block, are to be predicted. Because there are more than one motion vectors to be predicted, the candidate list for motion vectors at all control points is organized in grouped way such that each candidate in the list includes a set of motion vector predictors for all control points. For example, candidate 1={predictor for control point A, predictor for control point B, predictor for control point C}; candidate 2={predictor for control point A, predictor for control point B, predictor for control point C}, etc. The predictor for the same control point in different candidates can be the same or different. The motion vector predictor flag ((mvp 10 flag for List 0 or mvp 11 flag for List 1) will be used to indicate which candidate from the list is chosen. After prediction, the residue part of the parameter, or the differences of the actual MVs to the MV predictors at the control points, are to be signaled. The MV predictor at each control point can also come from model based affine prediction from one of its neighbors, using the method described from the above description for merge mode based o signaling technique.

In some related methods, affine parameters for a block can be either purely derived from neighboring block's affine model or control points' MV predictor, or from explicitly signal the MV differences at the control points. However, in many cases the non-translational part of the affine parameters is very close to zero. Using unrestricted MV difference coding to signal the affine parameters has redundancy.

Aspects of the disclosure provide new techniques to better represent the affine motion parameters therefore improve coding efficiency of affine motion compensation. More specifically, to predict affine model parameters in a more efficient way, the translational parameters of a block are represented using a motion vector prediction, in the same way or similar way as that is for a regular inter prediction coded block. For example, the translational parameters can be indicated from a merge candidate. For the non-translational part, a few typically used parameters such as rotation parameter and zooming parameter are pre-determined with a set of fixed offset values. These values are considered as some refinements or offset around the default value. The encoder can evaluate the best option from these values and signal the index of the choice to the decoder. The decoder then restores the affine model parameters using 1) the decoded translational motion vector and 2) the index of the chosen non-translational parameters.

In the following description, 4-parameter affine model is used as an example, the methods described in the following description can be extended to other motion models, or affine models with different numbers of parameters as well, such as 6-parameter affine model, and the like. In some of the following description, the model used may not be always affine model, but possibly other types of motion model.

In an example, a 4-parameter affine model is described, such as shown by Eq. 1

$$\begin{cases} x' = \rho\cos\theta \cdot x + \rho\sin\theta \cdot y + c \\ y' = -\rho\sin\theta \cdot x + \rho\cos\theta \cdot y + f \end{cases} \qquad \text{Eq. 1}$$

where $\rho$ is the scaling factor for zooming, $\theta$ is the angular factor for rotation, and (c, f) is the motion vector to describe the translational motion. (x, y) is a pixel location in the current picture, (x', y') is a corresponding pixel location in the reference picture.

In an embodiment, a motion vector predictor (MVP) is used to represent the translational part of the affine model. For example, MVP=(c, f). The MVP can be derived from one of the existing regular (non-subblock based) merge candidates. In an example, the MVP can also be signaled in AMVP mode. If a merge candidate is bi-predicted, one of the MVs in a pair for this candidate may be used as the MVP for translational parameters prediction.

For non-translational parts of the affine model, when $\rho=1$ and $\theta=0$, the affine model goes back to the translational motion model. $\rho=1$ is considered as a default value for the scaling factor, and $\theta=0$ is considered as a default value for the angular factor.

According to an aspect of the disclosure, a mapping of indexes and offset values (or delta values) around a default value is pre-defined and known at the encoder side and the decoder side. Thus, at the encoder side, the encoder can determine the offset value, and then signal an index corresponding to the offset value according to the mapping. At the decoder side, the decoder can decode the index from the coded video stream, and determine the corresponding offset value to the decoded index according to the mapping.

Further, the decoder can determine an affine model parameter based on the default value for the affine model parameter and the determined offset value.

It is noted that, in some embodiments, the mapping of the indexes and offset values of an affine parameter can be represented in the form of a mapping of the indexes and the values of the affine parameter. Further, in some embodiments, the mapping of the indexes and the offset values of an affine parameter can be represented in the form of a mapping of the indexes and calculated function values of the affine parameter.

In some examples, a set of pre-defined delta values around the default values of the affine model parameters (e.g., $\rho=1$ and $\theta=0$) are used to approximate the actual affine model used in the current block. Because the number of delta values is limited, this technique can be regarded as a quantized version of signaling affine parameters. Below are a few examples to specify the values of $\rho$ and $\theta$. In the examples, idx_$\rho$ denotes the index for the offset value to the default value of $\rho$ (e.g., $\rho=1$), and idx_$\theta$ denotes to the index for the offset value to the default value of $\theta$ (e.g., $\theta=0$). When idx_$\rho$ and idx_$\theta$ are 0, the affine model is a translational model. When idx_$\rho$ and idx_$\theta$ are not zero, then small variations from the default values are used in affine model parameters prediction.

In an example, n is a preset and signaled for determining scaling parameter. The mapping of the idx_$\rho$ and $\rho$ can be defined according to Table 1:

TABLE 1

Mapping of the idx_$\rho$ and $\rho$

| Idx_$\rho$ | 0 | 1 | 2 | 3 | 4 | 5 | 6 | 7 | 8 |
|---|---|---|---|---|---|---|---|---|---|
| $\rho$ | 1 | 1+n | 1−n | 1+2n | 1−2n | 1+4n | 1−4n | 1+8n | 1−nn |

The signaling of n can be done at block level, CTU level, slice/picture level or sequence level. For example, n can be 1/16.

Table 2 shows another mapping example of the idx_$\rho$ and $\rho$:

TABLE 2

Mapping of the idx_$\rho$ and $\rho$

| Idx_$\rho$ | 0 | 1 | 2 | 3 | 4 | 5 | 6 | 7 | 8 |
|---|---|---|---|---|---|---|---|---|---|
| $\rho$ | 1 | 1+n | 1−n | 1+2n | 1−2n | 1+3n | 1−3n | 1+4n | 1−4n |

In another example, the mappings of idx_$\theta$ to $\sin\theta$ and $(\cos\theta)^2$ are defined according to Table 3:

TABLE 3

Mapping of idx_$\theta$ to $\sin\theta$ and $(\cos\theta)^2$

| Idx_$\theta$ | 0 | 1 | 2 | 3 | 4 | 5 | 6 | 7 | 8 |
|---|---|---|---|---|---|---|---|---|---|
| $(\cos\theta)^2$ | 1 | 1 1/32 | 1 1/32 | 1 1/16 | 1 1/16 | 1 1/8 | 1 1/8 | 1 1/4 | 1 1/4 |
| $\sin\theta$ | 0 | Sqrt(1/32) | −Sqrt(1/32) | 1/4 | −1/4 | Sqrt(1/8) | −Sqrt(1/8) | 1/2 | −1/2 |

In another example, $\alpha$ is a preset and signaled for determining angle parameter. The mapping of idx_$\theta$ and $\theta$ can be defined according to Table 4:

TABLE 4

Mapping of the idx_$\theta$ and $\theta$

| Idx_$\theta$ | 0 | 1 | 2 | 3 | 4 | 5 | 6 | 7 | 8 |
|---|---|---|---|---|---|---|---|---|---|
| $\theta$ | 1 | +$\alpha$ | −$\alpha$ | +2$\alpha$ | −2$\alpha$ | +3$\alpha$ | −3$\alpha$ | +4$\alpha$ | −4$\alpha$ |

The signaling of $\alpha$ can be done at block level, CTU level, slice/picture level or sequence level.

Table 5 shows another mapping example of idx_$\theta$ and $\theta$:

TABLE 5

Mapping of the idx_$\theta$ and $\theta$

| Idx_$\theta$ | 0 | 1 | 2 | 3 | 4 | 5 | 6 | 7 | 8 |
|---|---|---|---|---|---|---|---|---|---|
| $\theta$ | 1 | +$\alpha$ | −$\alpha$ | +2$\alpha$ | −2$\alpha$ | +4$\alpha$ | −4$\alpha$ | +8$\alpha$ | −8$\alpha$ |

In the above examples, the binarization of the indices can be configured in the following way: 1 bit is used to signal if the index is 0 or not. If yes, not additional bit is needed. If not, in one embodiment, variable length coding, such as truncated binary, exponential-golomb code, etc, applies to index from 1~8. In another embodiment, if not, fix length coding is used to signal index from 1-8.

It is noted that the possible number of delta values is not limited to 8. Other suitable values, such as 4, 16, etc. can be used.

In some embodiments, the affine model is predicted using control point MVs at 2 or 3 corners, either by the model-based prediction or corner control points based prediction. After the motion vector prediction for two or three control points, the MV differences of these control points are determined and signaled at the encoder side. Then, the decoder side can decode the MV difference, and perform motion vector prediction to determine MVs at the control points.

Similarly to the above mapping examples, a set of pre-defined delta values are used to represent the MV difference. In one embodiment, a usage flag is signaled first, to indicate whether the MVD (motion vector difference) is zero or is signaled according to the present disclosure. In an example, when the MVD is signaled according to the present disclosure, MV difference is assumed to be x direction or y direction, but not both. In this case, for each MVD, a combination of direction and distance indices can be used to represent this MVD. Table 6 shows a mapping example of direction indexes (direction IDXs) to directions, and Table 7 shows a mapping example of distance indexes (distance IDXs) to distances in term of pixels. The direction index represents the direction of the MVD relative to the starting point (MV predictor).

TABLE 6

Mapping of direction IDXs to directions

| Direction IDX | 00 | 01 | 10 | 11 |
|---|---|---|---|---|
| x-axis | + | − | N/A | N/A |
| y-axis | N/A | N/A | + | − |

TABLE 7

Mapping of distance IDXs to distances

| Distance IDX | 0 | 1 | 2 | 3 | 4 | 5 | 6 | 7 |
|---|---|---|---|---|---|---|---|---|
| Pixel distance | ¼-pel | ½-pel | 1-pel | 2-pel | 4-pel | 8-pel | 16-pel | 32-pel |

In another example, the directions of MV difference include x direction only, y direction only, and diagonal directions (e.g., 45°, 135°, 225°, and 315°). Table 8 shows a mapping example of direction indexes (direction IDXs) to directions.

TABLE 8

Mapping of direction IDXs to directions

| Direction IDX | 000 | 001 | 010 | 011 | 100 | 101 | 110 | 111 |
|---|---|---|---|---|---|---|---|---|
| x-axis | + | + | 0 | − | − | − | 0 | + |
| y-axis | 0 | + | − | − | 0 | + | + | − |

In Table 8, for each of the 8 directions, the value determined from the distance index will be applied to each of the x and y direction that is non-zero. For example, when the distance index is 2, and the direction index is 3 (011 in binary), 1-pel offset is applied to the −x direction, and 1-pel offset is applied to the −y direction from the starting point MV. In another example, when the distance index is 2, and the direction index is 2 (010 in binary), 1-pel offset is applied to −y direction from the starting point MV.

In an embodiment, the above approximation is done for every MV difference of the affine mode.

In another embodiment, after coding of MV difference for the first control point, the MV difference for the first control point is used to predict other MV difference(s) for other control points before performing MVD coding for other MVD(s). This is referred as MVD prediction. After MVD prediction for a second control point for example, the MVD prediction error of the second control point is to be coded using the methods proposed in this disclosure, that is, use a pre-defined set of values to approximate the actual value.

Figure 13:
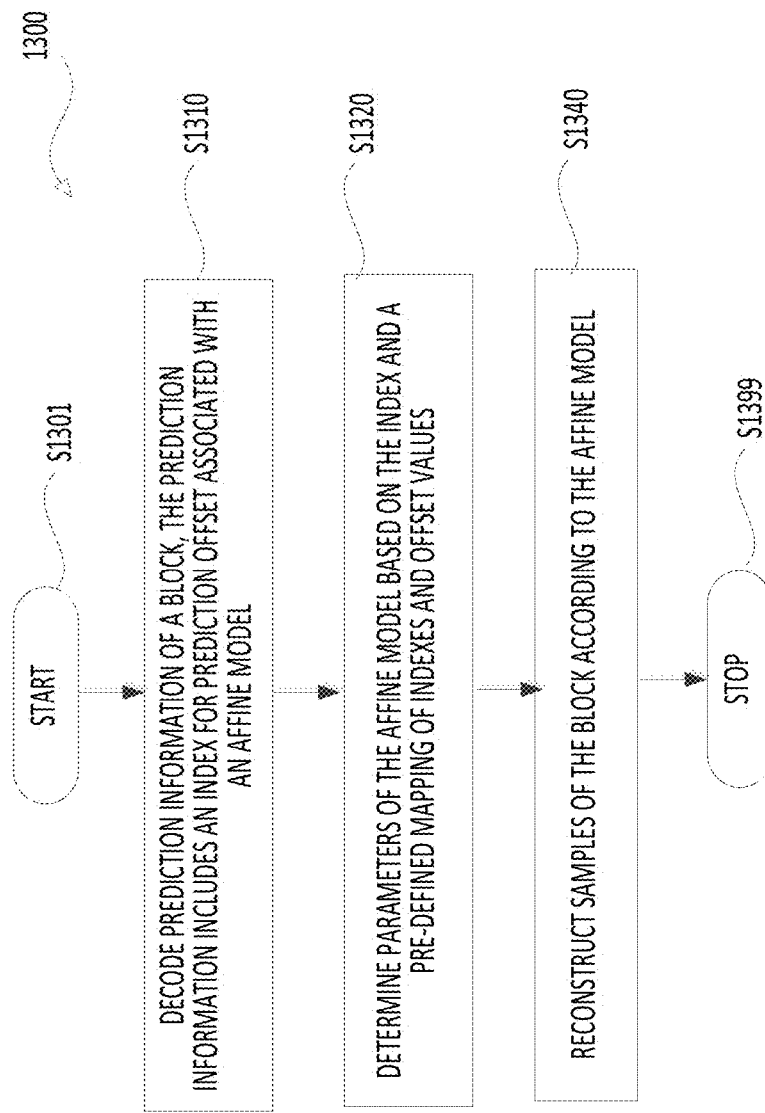
FIG. 13 shows a flow chart outlining a process example according to some embodiments of the disclosure.

FIG. 13 shows a flow chart outlining a process (1300) according to an embodiment of the disclosure. The process (1300) can be used in the reconstruction of a block coded in intra mode, so to generate a prediction block for the block under reconstruction. In various embodiments, the process (1300) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1300) is implemented in software instructions, thus when the processing circuitry executes the software instructions, the processing circuitry performs the process (1300). The process starts at (S1301) and proceeds to (S1310).

At (S1310), prediction information of a block is decoded from a coded video bitstream. The prediction information is indicative of an affine mode that uses an affine model of motion information, such as 6-parameter affine motion model, 4-parameter affine motion model and the like. The prediction information includes an index for a prediction offset (to a default value) associated with the affine model.

At (S1320), parameters of the affine model are determined based on the index and a pre-defined mapping of indexes and offset values. Tables 1-8 show various examples of pre-defined mappings of indexes and offset values, and can be used to determine parameters of the affine model.

At (S1330), samples of the block are reconstructed according to the affine model. In an example, a reference pixel in the reference picture that corresponds to a pixel in the block is determined according to the affine model. Further, the pixel in the block is reconstructed according to the reference pixel in the reference picture. Then, the process proceeds to (S1399) and terminates.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
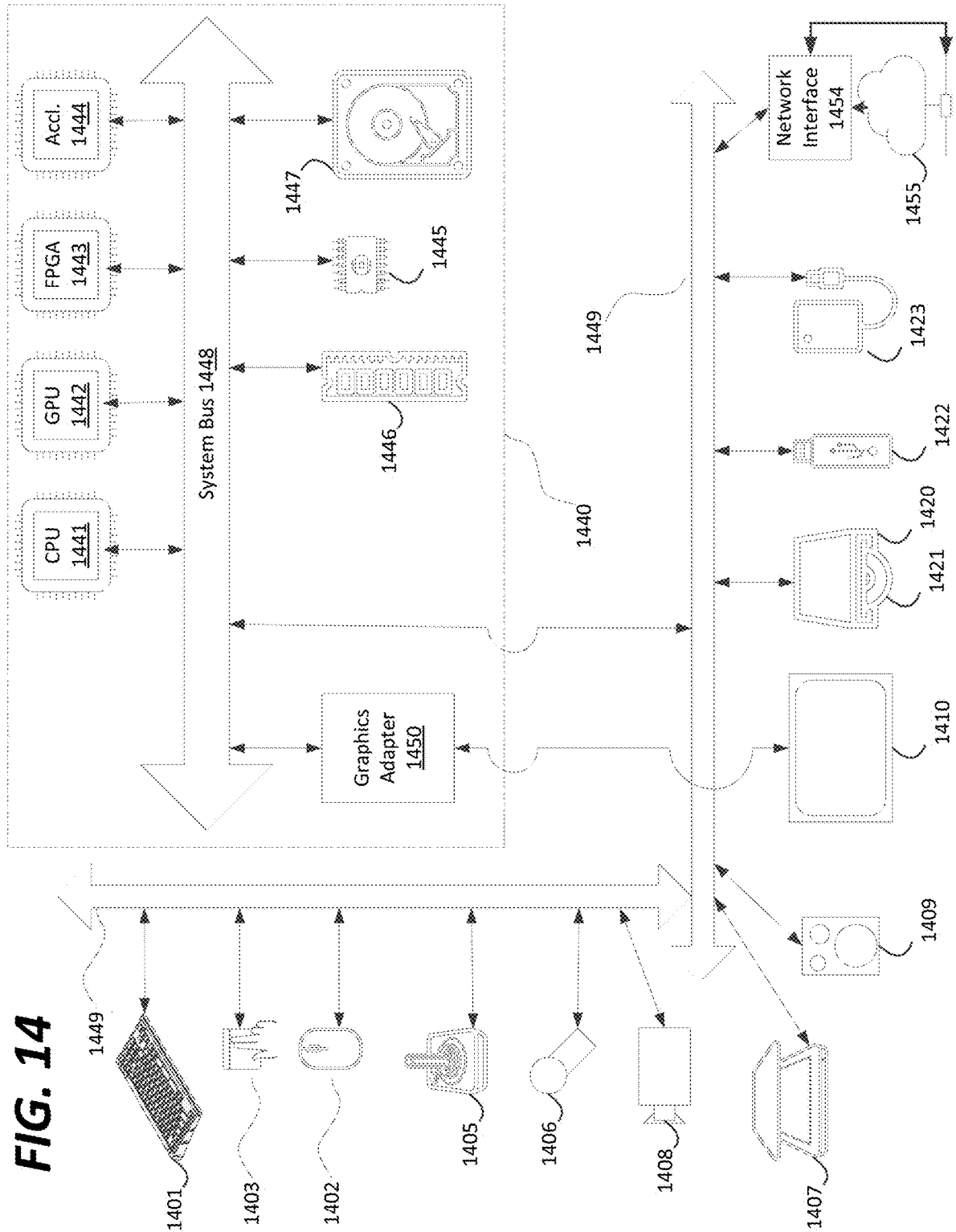
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding in a decoder, comprising:
decoding prediction information of a block in a current picture from a coded video bitstream, the prediction information including a first index for a prediction offset associated with an affine model in an inter prediction mode, the affine model being used to transform between the block and a reference block in a reference picture that has been reconstructed;
determining a multiplier of a non-translational parameter of the affine model, the multiplier being determined according to a default value and an offset value of a first plurality of offset values determined according to the first index, the first plurality of offset values mapped to respective indexes; and
reconstructing at least a sample of the block according to the affine model.

2. The method of claim 1, further comprising:
determining values of translational parameters of the affine model according to a motion vector.

3. The method of claim 2, wherein
the multiplier of the affine model is a scaling factor in the affine model, and
the offset value indicates a delta value to be applied to the default value of the scaling factor in the affine model.

4. The method of claim 2, wherein
the multiplier of the affine model is a rotation angle in the affine model, and
the offset value indicates a delta value to be applied to the default value.

5. The method of claim 1, further comprising:
determining a first motion vector difference of the affine model according to which offset value of a second plurality of offset values is determined to be associated with a second index; and
deriving the affine model based on a predicted motion vector and the first motion vector difference.

6. The method of claim 5, wherein
the offset value of the second plurality of offset values indicates a pixel distance of the first motion vector difference, and
the method further includes determining a direction of the first motion vector difference according to an index of another plurality of indexes.

7. The method of claim 5, wherein
the offset value of the second plurality of offset values indicates a pixel distance of the first motion vector difference, and
the second index is associated with both a direction and the pixel distance of the first motion vector difference.

8. The method of claim 5, further comprising:
determining a second motion vector difference of the affine model according to which of the second plurality of offset values is associated with a third index corresponding to one of the second plurality of offset values, the first and second motion vector differences being for two control points;
determining motion vectors for the two control points based on the first and second motion vector differences; and
deriving a 4-parameter affine model based on the motion vectors of the two control points.

9. The method of claim 5, further comprising:
determining a second motion vector difference of the affine model according to which of the second plurality of offset values is associated with a third index corresponding to one of the second plurality of offset values,
determining a third motion vector difference of the affine model based on which of the second plurality of offset values is associated with a fourth index corresponding to one of the second plurality of offset values, the first, second, and third motion vector differences being for three control points;
determining motion vectors for the three control points based on the first, second, and third motion vector differences; and
deriving a 6-parameter affine model based on the motion vectors of the three control points.

10. The method of claim 1, further comprising:
determining a first motion vector difference for a first control point based on an offset value associated with a second index corresponding to a second plurality of offset values;
predicting a second motion vector difference for a second control point based on the first motion vector difference;
decoding a prediction error to correct the second motion vector difference from the coded video bitstream;
determining a first motion vector for the first control point and a second motion vector for the second control point based on the first motion vector difference and the corrected second motion vector difference; and
deriving the affine model at least based on the first motion vector for the first control point and the second motion vector for the second control point.

11. An apparatus for video decoding, comprising:
processing circuitry configured to:
decode prediction information of a block in a current picture from a coded video bitstream, the prediction information including a first index for a prediction offset associated with an affine model in an inter prediction mode, the affine model being used to transform between the block and a reference block in a reference picture that has been reconstructed;
determining a multiplier of a non-translational parameter of the affine model, the multiplier being determined according to a default value and an offset value of a first plurality of offset values determined according to the first index, the first plurality of offset values mapped to respective indexes; and
reconstruct at least a sample of the block according to the affine model.

12. The apparatus of claim 11, wherein
the processing circuitry is configured to determine values of translational parameters of the affine model according to a motion vector.

13. The apparatus of claim 12, wherein
the multiplier of the affine model is a scaling factor in the affine model, and
the offset value indicates a delta value to be applied to the default value of the scaling factor in the affine model.

14. The apparatus of claim 12, wherein
the multiplier of the affine model is a rotation angle in the affine model, and
the offset value indicates a delta value to be applied to the default value of the rotation angle in the affine model.

15. The apparatus of claim 11, wherein the processing circuitry is configured to
determine a first motion vector difference of the affine model according to which offset value of a second plurality of offset values is determined to be associated with a second index, and
derive the affine model based on a predicted motion vector and the first motion vector difference.

16. The apparatus of claim 15, wherein
the offset value of the second plurality of offset values indicates a pixel distance of the first motion vector difference, and
the processing circuitry is configured to determine a direction of the first motion vector difference according to an index of another plurality of indexes.

17. The apparatus of claim 15, wherein
the offset value of the second plurality of offset values indicates a pixel distance of the first motion vector difference, and
the second index is associated with both a direction and the pixel distance of the first motion vector difference.

18. The apparatus of claim 15, wherein the processing circuitry is configured to:
determine a second motion vector difference of the affine model according to which of the second plurality of offset values is associated with a third index corresponding to one of the second plurality of offset values, the first and second motion vector differences being for two control points;
determine motion vectors for the two control points based on the first and second motion vector differences; and
derive a 4-parameter affine model based on the motion vectors of the two control points.

19. The apparatus of claim 15, wherein
the processing circuitry is configured to
determine a second motion vector difference of the affine model according to which of the second plurality of offset values is associated with a third index corresponding to one of the second plurality of offset values, and
determine a third motion vector difference of the affine model according to which of the second plurality of offset values is associated with a fourth index corresponding to one of the second plurality of offset values;
the first, second, and third motion vector differences being for three control points;
determine motion vectors for the three control points based on the first, second, and third motion vector differences; and
derive a 6-parameter affine model based on the motion vectors of the three control points.

20. A non-transitory computer-readable medium storing instructions which when executed by a computer for video decoding cause the computer to perform:
decoding prediction information of a block in a current picture from a coded video bitstream, the prediction information including a first index for a prediction offset associated with an affine model in an inter prediction mode, the affine model being used to transform between the block and a reference block in a reference picture that has been reconstructed;

determining a multiplier of a non-translational parameter of the affine model, the multiplier being determined according to a default value and an offset value of a plurality of offset values determined according to the first index, the plurality of offset values mapped to respective indexes; and reconstructing at least a sample of the block according to the affine model.

\* \* \* \* \*